United States Patent
O'Brien et al.

(10) Patent No.: US 8,308,003 B2
(45) Date of Patent: Nov. 13, 2012

(54) SEAL FOR A CONTAINER

(75) Inventors: David John O'Brien, Oxhey (GB);
Victor Sachs, Sanderstead (GB);
Andrew Fenwick McLean, Reading (GB)

(73) Assignee: Selig Sealing Products, Inc., Forrest, IL (US)

( * ) Notice: Subject to any disclaimer, the term of this patent is extended or adjusted under 35 U.S.C. 154(b) by 168 days.

(21) Appl. No.: 12/665,239

(22) PCT Filed: Jun. 19, 2008

(86) PCT No.: PCT/US2008/067445
§ 371 (c)(1),
(2), (4) Date: Feb. 25, 2010

(87) PCT Pub. No.: WO2009/002795
PCT Pub. Date: Dec. 31, 2008

(65) Prior Publication Data
US 2010/0193463 A1    Aug. 5, 2010

(30) Foreign Application Priority Data

Jun. 22, 2007  (EP) .................................... 07110921

(51) Int. Cl.
*B65D 53/04*     (2006.01)
*B65D 41/04*     (2006.01)

(52) U.S. Cl. .......... 215/232; 215/341; 215/347; 53/478; 156/60; 156/244.27; 428/200; 428/317.3

(58) Field of Classification Search .................. 215/232, 215/341, 347, 329; 156/60, 244.27; 428/317.3, 428/200; 53/478
See application file for complete search history.

(56) References Cited

U.S. PATENT DOCUMENTS

| | | | |
|---|---|---|---|
| 4,206,165 A | | 6/1980 | Dukess |
| 4,650,082 A | * | 3/1987 | Paciorek ........................ 215/230 |
| 4,741,791 A | | 5/1988 | Howard et al. |
| 4,818,577 A | | 4/1989 | Ou-Yang |
| 4,837,061 A | | 6/1989 | Smits et al. |
| 4,892,209 A | | 1/1990 | Dorfman et al. |

(Continued)

FOREIGN PATENT DOCUMENTS

AT          501 393 A1      8/2006

(Continued)

OTHER PUBLICATIONS

European Patent Office Extended European Search Report for European Application 07110921.9 dated Dec. 21, 2007 (5 pages).

(Continued)

*Primary Examiner* — Mickey Yu
*Assistant Examiner* — Niki Eloshway
(74) *Attorney, Agent, or Firm* — Fitch, Even, Tabin & Flannery, LLP

(57) ABSTRACT

A seal for a container for comestibles, especially potable liquids, and in particular for use for sealing polyester containers such as bottles, which is suitable for passage through a PET recycling process, comprises a metal foil layer, a foam layer and a plastics film layer as well as a heat sealable layer below the foil. The foam is selected for its density and thickness so is to confer upon the seal a high buoyancy. The adhesion a between the foam and the foil is increased compared to currently available products, in order to prevent de-lamination between the foil and the foam during the recycling process.

30 Claims, 3 Drawing Sheets

U.S. PATENT DOCUMENTS

| | | | |
|---|---|---|---|
| 4,960,216 A * | 10/1990 | Giles | 215/232 |
| 4,961,986 A | 10/1990 | Galda et al. | |
| 5,004,111 A * | 4/1991 | McCarthy | 215/232 |
| 5,015,318 A | 5/1991 | Smits et al. | |
| 5,055,150 A | 10/1991 | Rosenfeld et al. | |
| 5,057,365 A | 10/1991 | Finkelstein et al. | |
| 5,071,710 A | 12/1991 | Smits et al. | |
| 5,098,495 A | 3/1992 | Smits et al. | |
| 5,149,386 A | 9/1992 | Smits et al. | |
| 5,160,767 A | 11/1992 | Genske et al. | |
| 5,178,967 A | 1/1993 | Rosenfeld et al. | |
| 5,197,618 A | 3/1993 | Goth | |
| 5,226,281 A | 7/1993 | Han et al. | |
| 5,265,745 A | 11/1993 | Pereyra et al. | |
| 5,381,914 A | 1/1995 | Koyama et al. | |
| 5,598,940 A | 2/1997 | Finkelstein et al. | |
| 5,601,200 A | 2/1997 | Finkelstein et al. | |
| 5,615,789 A | 4/1997 | Finkelstein et al. | |
| 5,669,521 A | 9/1997 | Wiening et al. | |
| 5,975,304 A | 11/1999 | Cain et al. | |
| 6,082,566 A | 7/2000 | Yousif et al. | |
| 6,131,754 A | 10/2000 | Smelko | |
| 6,139,931 A | 10/2000 | Finkelstein et al. | |
| 6,194,042 B1 * | 2/2001 | Finkelstein et al. | 428/36.5 |
| 6,277,478 B1 | 8/2001 | Kurita et al. | |
| 6,302,321 B1 * | 10/2001 | Reese et al. | 229/123.1 |
| 6,312,776 B1 | 11/2001 | Finkelstein et al. | |
| 6,378,715 B1 | 4/2002 | Finkelstein et al. | |
| 6,458,302 B1 | 10/2002 | Shifflet | |
| 6,544,613 B1 * | 4/2003 | Varadarajan | 428/36.9 |
| 6,602,309 B2 | 8/2003 | Vizulis et al. | |
| 6,699,566 B2 | 3/2004 | Zeiter et al. | |
| 6,705,467 B1 | 3/2004 | Kancsar et al. | |
| 6,722,272 B2 | 4/2004 | Jud | |
| 6,767,425 B2 | 7/2004 | Meier | |
| 6,866,926 B1 | 3/2005 | Smelko et al. | |
| 6,902,075 B2 * | 6/2005 | O'Brien et al. | 215/232 |
| 6,916,516 B1 | 7/2005 | Gerber et al. | |
| 6,955,736 B2 | 10/2005 | Rosenberger et al. | |
| 6,974,045 B1 | 12/2005 | Trombach et al. | |
| 7,128,210 B2 | 10/2006 | Razeti et al. | |
| 7,182,475 B2 | 2/2007 | Kramer et al. | |
| RE39,790 E | 8/2007 | Fuchs et al. | |
| 7,316,760 B2 | 1/2008 | Nageli | |
| 7,448,153 B2 | 11/2008 | Maliner et al. | |
| 7,531,228 B2 | 5/2009 | Perre et al. | |
| 7,568,586 B2 * | 8/2009 | Walters, Jr. | 215/305 |
| 7,713,605 B2 | 5/2010 | Yousif et al. | |
| 7,740,927 B2 | 6/2010 | Yousif et al. | |
| 7,798,359 B1 * | 9/2010 | Marsella | 220/359.3 |
| 7,819,266 B2 | 10/2010 | Ross et al. | |
| 7,832,580 B2 * | 11/2010 | Jackman | 215/347 |
| 7,838,109 B2 | 11/2010 | Declerck | |
| 2002/0068140 A1 | 6/2002 | Finkelstein et al. | |
| 2003/0196418 A1 * | 10/2003 | O'Brien et al. | 53/490 |
| 2004/0109963 A1 | 6/2004 | Zaggia et al. | |
| 2004/0249046 A1 | 12/2004 | Abhari et al. | |
| 2005/0048307 A1 | 3/2005 | Schubert et al. | |
| 2005/0208242 A1 | 9/2005 | Smelko et al. | |
| 2006/0000545 A1 | 1/2006 | Nageli et al. | |
| 2006/0003120 A1 | 1/2006 | Nageli et al. | |
| 2006/0003122 A1 | 1/2006 | Nageli et al. | |
| 2006/0151415 A1 | 7/2006 | Smelko et al. | |
| 2007/0298273 A1 | 12/2007 | Thies et al. | |
| 2008/0026171 A1 | 1/2008 | Gullick et al. | |
| 2008/0103262 A1 | 5/2008 | Haschke | |
| 2008/0156443 A1 | 7/2008 | Schaefer et al. | |
| 2008/0169286 A1 * | 7/2008 | McLean et al. | 220/257.2 |
| 2008/0233339 A1 | 9/2008 | Thorstensen-Woll | |
| 2009/0078671 A1 | 3/2009 | Triquet et al. | |
| 2009/0208729 A1 | 8/2009 | Allegaert et al. | |
| 2009/0304964 A1 * | 12/2009 | Sachs et al. | 428/36.5 |
| 2010/0009162 A1 | 1/2010 | Rothweiler | |
| 2010/0030180 A1 | 2/2010 | Declerck | |
| 2010/0047552 A1 | 2/2010 | McLean et al. | |
| 2010/0059942 A1 | 3/2010 | Rothweiler | |
| 2010/0116410 A1 | 5/2010 | Yousif | |
| 2010/0155288 A1 | 6/2010 | Harper et al. | |
| 2010/0170820 A1 | 7/2010 | Leplatois et al. | |
| 2010/0213193 A1 | 8/2010 | Helmlinger et al. | |
| 2010/0221483 A1 | 9/2010 | Gonzalez Carro et al. | |
| 2010/0290663 A1 | 11/2010 | Trassl et al. | |
| 2010/0314278 A1 | 12/2010 | Fonteyne et al. | |
| 2011/0000917 A1 | 1/2011 | Wolters et al. | |
| 2011/0005961 A1 | 1/2011 | Leplatois et al. | |
| 2011/0091715 A1 | 4/2011 | Rakutt et al. | |
| 2011/0138742 A1 | 6/2011 | McLean | |

FOREIGN PATENT DOCUMENTS

| | | |
|---|---|---|
| AT | 11 738 U1 | 4/2011 |
| BR | 8200231 U | 9/2003 |
| BR | 0300992 A | 11/2004 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 668 221 A1 | 8/1995 |
| EP | 0 826 598 A2 | 3/1998 |
| EP | 0 826 599 A2 | 3/1998 |
| EP | 0 717 710 B1 | 4/1999 |
| EP | 0 915 026 A1 | 5/1999 |
| EP | 0 706 473 A1 | 8/1999 |
| EP | 0 803 445 B1 | 11/2003 |
| EP | 1 834 893 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 968 020 A1 | 9/2008 |
| EP | 1 992 476 A1 | 11/2008 |
| EP | 2 230 190 A1 | 9/2010 |
| EP | 2 292 524 A1 | 3/2011 |
| FR | 2 916 157 A1 | 11/2008 |
| FR | 2 943 322 A1 | 9/2010 |
| JP | 2000-255621 A | 9/2000 |
| JP | 2004-315035 A | 11/2004 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| TW | 194965 | 11/1992 |
| WO | 00/66450 A1 | 11/2000 |
| WO | 03/066465 A1 | 8/2003 |
| WO | 2006/018556 A1 | 2/2006 |
| WO | 2006/021291 A1 | 3/2006 |
| WO | 2008/027029 A2 | 3/2008 |
| WO | 2008/027036 A1 | 3/2008 |
| WO | 2008/039350 A2 | 4/2008 |
| WO | 2008/125784 A1 | 10/2008 |
| WO | 2008/125785 A1 | 10/2008 |
| WO | 2008/148176 A1 | 12/2008 |
| WO | 2010/115811 A1 | 10/2010 |
| WO | 2011/039067 A1 | 4/2011 |

OTHER PUBLICATIONS

International Searching Authority International Search Report for International Application PCT/US2008/067445 dated Sep. 2, 2008 (2 pages).

Written Opinion of the International Searching Authority for International Application PCT/US2008/067445 dated Sep. 2, 2008 (5 pages).

The International Bureau of WIPO International Preliminary Report on Patentability for International Application PCT/US2008/067445 dated Dec. 22, 2009 (6 pages).

* cited by examiner

SEAL FOR A CONTAINER

CROSS-REFERENCE TO RELATED APPLICATIONS

This application is a U.S. national phase application filed under 35 U.S.C. §371 of International Application PCT/US2008/067445, filed on Jun. 19, 2008, designating the United States, which claims priority from European Application 07110921.9, filed Jun. 22, 2007, which are hereby incorporated herein by reference in their entirety.

FIELD

The present invention relates to a seal for a container for commestibles, usually potable liquids, which may be passed through recycling processes of the type currently used to recover polyethylene terephthalate from bottles, so as to be removed with other non-PET materials.

BACKGROUND

Seals suitable for heat sealing around the mouth of a container for a commestible item may contain a metal foil layer, primarily used for induction heat sealable seals. The metal foil layer has on its underside heat sealable layers for adhering to the bottle mouth and, on the upper side, layers to provide mechanical strength and an upper surface which may be provided with print or other application of data. Seals in which a tab is provided lying wholly within the circumference of the seal have been described in, for instance, WO03/066465, U.S. Pat. No. 4,961,986 and U.S. Pat. No. 6,866,926. The tab may be formed by preventing lamination in a segment shaped portion of the seal, for instance by interleaving a tabstock material between a top, overall plastics layer and the underlying layer. An adhesive layer is positioned between the tabstock and the plastics layer, and continues between the plastics layer and the portion of the underlying layer extending beyond the tabstock.

Induction heating of the heat seal layer is often conducted after application of a cap, for instance a screw cap, to the neck of a container, the seal being pre-positioned within the cap. In order to provide a uniform pressure between the cap and the mouth of the container, so that the seal becomes adhered upon melting of the heat sealable layer, it is known to provide a resilient layer within the seal. This may be provided by a separate secondary liner, which is fixed in the cap above the seal e.g. formed of wadding material or foam. Alternatively it may be a layer within the seal itself positioned, for instance, between the metal foil and the top surface. Such a resilient layer may be formed of foamed polyolefin material, for instance.

There is an increasing attempt to recycle materials used in packaging consumer items, for instance bottles used for containing potable liquids. Polyethylene terephthalate is a convenient material widely used for such bottles, and processes have been developed for separating during recycling PET from other materials used in the production of containers, for instance materials used for the caps, labels and liners (or gaskets) for caps. PET has a density greater than 1 g/ml and is conveniently separate from other materials, which have a density less than 1, by a process involving aqueous baths, in which the PET sinks, and most other materials float. As well as separating labels and other particulate materials, the PET needs to be cleaned of residues of, for instance adhesives and rinsed, before being in a form suitable for reforming into containers or other end products by techniques involving melting the material. Several of the baths used in the recycling process tend to be highly caustic and are used at raised temperatures, for instance above 80° C. The materials remain in the baths for several minutes and are agitated therein. Under these conditions, we have found that aluminium exposed to the liquid may be rapidly degraded which reduces the life of the bath. Also, since one of the objectives of the bath is to remove deposits of adhesives, these baths often degrade adhesive layers used in the production of the laminates from which seals are produced. If aluminium degrades, then materials in adjacent layers tend to be released. Aluminium has a density of more than 1 g/ml. Depending on how it is incorporated into a seal, a chip containing an aluminium layer may sink with PET or float with other materials. We have appreciated that steps need to be taken to avoid chips containing aluminium sinking with the PET. The presence of residues of aluminium in PET being reused is very undesirable.

SUMMARY

A new seal according to the invention for a container for commestibles is formed of a laminate comprising the following coextensive layers:
  a) a plastics top layer;
  b) a plastic foam adhesive layer;
  c) a foam layer;
  d) a foam/foil adhesive layer;
  e) a metal foil; and
  f) a heat seal layer;
wherein the plastics/foam adhesive adheres the foam to the plastics layer over at least a portion of their mutually facing surfaces, wherein the foam/foil adhesive layer adheres the foam to the foil over substantially the entire area of their mutually facing surfaces with a bond strength of at least 8N/12.5 mM, as measured by the 180° peel test (330 mm per minute, ambient temperature), and wherein the seal has a measured density in the range 0.6 to 0.95 g ml as determined by the density measurement method described herein.

The plastics top layer is preferably formed of a polyester film, for instance a film of PET. Preferably the plastics top layer is transparent, thereby allowing printing of information on the underside, or on a lower layer visible therethrough. Suitably a PET top layer has a thickness in the range 10 to 50 μm thick.

The metal foil is preferably one useful for induction heat sealing. Most currently available induction heat sealing devices are suitable for use with aluminium foils. Thus the metal foil is preferably of aluminium, for instance having a thickness in the range 10 to 30 μm.

The heat seal layer may comprise a material suitable for melting and adhering to the mouth of a container, as well as being suitable for use in contact with commestible materials. The layer may also comprise other materials, for instance to provide strength to the adjacent foil material. Conveniently the heat seal layer comprises a layer of a polyester material in combination with the hot melt adhesive material, for instance provided as a coextruded material. Adhesion between the heat seal layer and the foil should be by known methods, for instance by use of a solvent based adhesive, an aqueous based adhesive, an extrudable adhesive or a solvent less adhesive. The application level of the adhesive between the foil and the heat seal layer is, for instance, between 1 and 10 g/m$^2$, preferably between 2 and 6 g/m$^2$.

The foam layer generally comprises a polyolefin foam. This is formed from a material having an initial density of less than 0.75 g/ml, preferably less than 0.7 g/ml, for instance 0.65 g/ml or less. In order to provide optimum resilience, the density should be above around 0.4 g/ml, preferably at least 0.5 g/ml. Suitably the foam of a polyethylene or ethylene copolymer, or polypropylene. The thickness of the foam is generally adapted so as to provide the desired density characteristic on the total seal. The thickness thus should be high enough for the overall density to be below the maximum density of 0.95 g/ml. Preferably the measured density is less than 0.90 g/ml, for instance as low as 0.85 g/ml, or even down to 0.6 g/ml but is often more than 0.8 g/ml. Accordingly the thickness of the foam is preferably at least 125 µm, more preferably at least 150 µm, for instance more than 180 µm. It is generally undesirable for the thickness to be higher than 300 µm, and is often less than 250 µm. The thickness and the density of the foam as quoted here relates to the thickness of the layer before it is laminated with the other components of the seal. The density may be increased and the thickness decreased somewhat by the lamination steps, although these steps are generally designed to minimize such changes e.g. by avoiding application of pressure at a temperature such that the material from which the foam is formed softens. It can be assumed that the thickness of the foam in the seal is no thicker than the thickness of the starting material.

During the recycling process, to avoid components comprising a metal foil layer sinking with the PET in the flotation bath, the foil must remain adhered to the foam. Accordingly it is the adhesion between the metal foil and the foam which must be particularly strong and resistant to the hot caustic liquid in the cleaning baths under the conditions of time and agitation applied. For this purpose the peel strength is more than the defined minimum.

The foam may be directly attached to the foil by an adhesive coating. Alternatively there may be additional layers forming part of the adhesive layer between the foil and the foam. In an embodiment the adhesive between the foam and the metal foil comprises a hot melt material applied by extrusion or, alternatively, a solvent or aqueous-based adhesive material applied as a liquid between the foil and the foam. Preferably it is a two part (e.g. polyurethane type) adhesive applied as a liquid between the foil and the foam and curved. Where a hot melt material is used, its melting temperature should be selected so as to be capable of activation during manufacturing without activating the heat seal layer already provided on the opposite side of the foil. Alternatively the heat seal layer on the opposite side of the foil is applied in a later manufacturing step. A solvent-free two part polyurethane adhesive is preferred for the foam/foil adhesive. Coating levels may be in the range 1 to 10 gm$^{-2}$.

The 180° peel test used to determine the bond strength between the foam and the foil is carried out as follows. The test must be carried out by cutting a sample from the web from which a seal is cut. (Normally the seal itself is not large enough to cut an appropriate sized sample or to peel sufficient material to provide a value for the running peel strength). The samples are cut from a strip 12.5 mm wide taken across the web of laminate. The sample should be at least 80 mm long. The peel strength is to be determined between a portion where the plastics top layer is adhered to the foam on the opposite side to the foil, at the location where the adhesive peel is to be commenced. In order to allow the foil and underlying layers to be clamped into one jaw of the tensile tester, and layers of the laminate including the foam to be attached in the other jaw, a portion of the adhesive is initially removed, for instance by use of an appropriate solvent, which attacks that adhesive, which does not attack the other adhesives, and which does not damage the integrity of the other components (foil, PET, foam). As indicated, the foil and underlying layers are fixed into one jaw of a tensile tester, with the foam and upper layers fixed in the other jaw. The jaws are then separated at 180° at a speed of 330 mm/minute. A 50N load cell is utilised for the test. The apparatus is set so as to allow an extension of at least 25 mm. The results quoted are the running peel force for the 12.5 mm wide sample.

The value for the 180° peel test should preferably be at least 8N/12.5 mm width carried out by this test, preferably at least 9N, more preferably at least 10N, for instance 11N or more, often as much as 15N.

The density of the seal is determined as follows. The seal has its diameter measured, in order to calculate the surface area. The thickness is measured using a FTM-1 Baty spring loaded dial thickness gauge with a 10 mm foot. The force generated by the springs on the foot is 1.8 to 2.2N. The liner is weighed using a suitable balance, for instance capable of measuring to at least two (preferably four) decimal places (grams). The density is calculated from the weight and the measured dimensions. The density should also take into account the presence of any tab by assuming that the seal will be cut so that the tab forms 50% of the surface area of the seal. The test may have to be carried out by cutting a suitable sample from a web, before punching of seals, if a seal is too small to accommodate the entire foot of the thickness gauge.

The seal is generally cut from a web of laminate. The invention also provides such a web, comprising;
 a) a polyester top layer;
 b) a plastics/foam adhesive layer;
 c) a polyolefin foam layer having a thickness of at least 125 µm, preferably in the range 150 µm to 350 µm;
 d) a foam/foil adhesive layer;
 e) an aluminium foil layer having a thickness of at least 12 µm; and
 f) a heat seal layer,
wherein the foam/foil adhesive layer adheres the foam to the foil over substantially the entire area of their facing surfaces with a bond strength of at least 8N/12.5 mm measured by the 180° peel test described herein, said laminate having a measured density as determined by the density measurement method described herein of less than 0.95 g/ml, preferably less than 0.9 g/ml, for instance in the range 0.6 to 0.9 g/ml.

The laminate web may be formed, for instance, by adhering together two preformed laminates by application of the plastics/foam adhesive layer and/or the foam/foil adhesive layer. Thus conveniently there is supplied a preformed laminate comprising heat seal layer, aluminium foil layer and foam layer, also having a suitable foil/foam adhesive for provision of the appropriate 180° peel strength. The polyester top layer, and any tabstock, is then adhered to this preformed laminate by application of the plastics/foam adhesive layer. Suitable methods of application of the adhesive involve application of a solvent or water-borne adhesive using liquid coating techniques, extrusion of an extrudable adhesive, such as based on a polyolefin, especially an ethylene copolymer, by application of a two part adhesive by liquid coating techniques or by a holt melt process in which the plastics top layer has a surface layer of a hot melt material e.g. ethylene-vinyl acetate (EVA) which is joined to the foam by application of heat from the plastics top layer side of the laminate, and pressure. Provision of heated and/or cooled rollers for application of pressure, allows adhesion to take place without damaging other heat sensitive layers. For an EVA hot melt coating a hot roller running at a temperature of between 120 to 145° C., preferably around 130 to 135° C. should be capable of adhering the foam to the plastics without excessive softening of the foam.

In another method, a preformed laminate of aluminium foil and heat seal layer is adhered to a preformed laminate of top layer, plastics/foam adhesive layer and foam layer by application of the foam/foil adhesive layer. Such an adhesive may be applied by coating a solvent or water-borne adhesive material, by extruding a hot melt adhesive or by application of a two part adhesive.

It may be possible to provide, either in sequential steps or simultaneously, both the plastics/foam adhesive layer and the foam/foil adhesive layer on each respective side of the foam layer, by moving the polyester top layer into contact with one surface of the foam and a preformed laminate of aluminium foil and heat seal layers on the other side of the foam with corresponding application of the adhesive layers on each side of the foam.

There is also provided in the present invention a new method for forming a laminate, wherein
a) a preformed laminate, of heat seal layer, a metal foil, a foam/foil adhesive
layer and a foam layer, and a plastic film are fed to a lamination station so that the plastic film is on the foam side of the preformed laminate;
b) a plastics/foam adhesive is applied between the mutually facing surfaces of the plastic film and the foam; and
c) pressure is applied at the laminating station between the preformed laminate and the plastic film whereby the foam surface is adhered to the plastic film;
wherein in the preformed laminate the foam layer and the metal foil/heat seal layer are joined by a bond strength as measured by the 180° peel strength test (330 mm/min, room temperature) of at least 8N/12.5 mm,
and wherein in the preformed laminate the foam layer has a thickness of at least 125 μm and a density of no more than 0.7 g/ml.

Preferably the method involves interposing a tab stock between the plastics film and the adhesive.

Preferably the foil is aluminium, has a thickness of at least 12 μm and the foam is at least 175 μm, more preferably at least 190 μm thick.

Preferably the density of the foam is no more than 0.7 g/ml, preferably less than 0.65 g/ml, in the preformed laminate.

The present invention also encompasses containers sealed with a seal of the invention, generally containing a commestible material. The container is preferably a recyclable polyester bottle, preferably containing a potable liquid. The container may also have a screw cap over the seal, for instance which is applied before induction heat sealing of the seal to the container. The container may alternatively have a dust cap over the seal may be applied after heat-sealing of the seal.

BRIEF DESCRIPTION OF THE DRAWINGS

The invention is further illustrated in the accompanying drawings in which.

DETAILED DESCRIPTION

Figure 1:
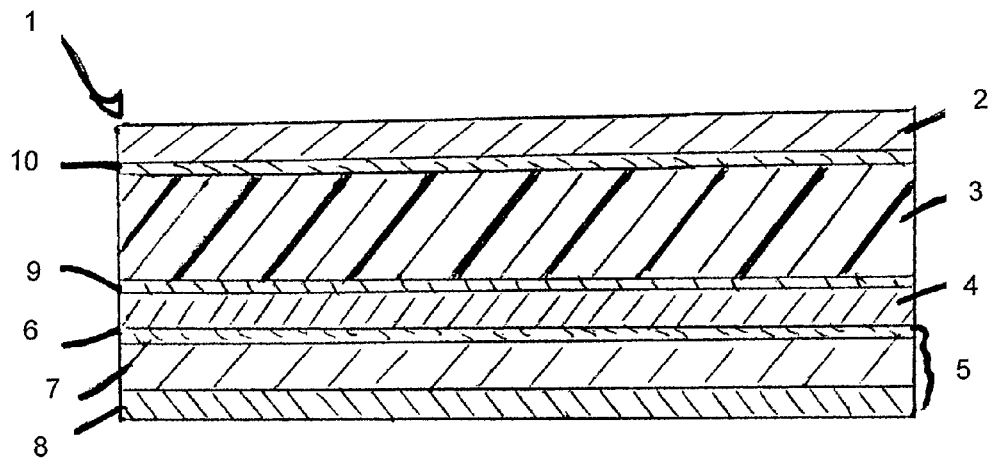
FIG. 1 is a section through a one-piece according to one embodiment of the invention.

As shown in FIG. 1, a seal (1) comprises a plastics top layer (2), a foam layer (3), a metal foil (4), a heat seal layer (5) comprising a combination of an adhesive layer (6), a further plastics film layer (7) and a heat seal layer (8). Furthermore the film comprises foam/foil adhesive layer (9) and plastics/foam adhesive layer (10).

In a preferred embodiment of the invention where the plastics/foam adhesive layer (10) is extended between the foam (3) and plastics (2), foam layer (3) is around 190 μm thick, and is formed from a polyethylene foam having a starting density of around 0.63 g/ml.

The plastics film layer (2) is preferably formed of transparent PET, for instance having a thickness in the range 15 to 30 μm, preferably around 23 μm.

Metal foil (4) is of aluminium, having a thickness of 15 μm.

The heat seal pre-laminate (5) is formed of a PET layer around 12 μm thick, with a coextruded adhesive layer (6), for adhering to foil (4). The adhesive is likely to have a thickness of around 12 μm, for instance up to 15 μm. The hot melt material layer (8), is generally around 12 μm thick.

Foam/foil adhesive layer (9) is preferably formed of a two-part polyurethane, preferably solvent-free type, applied at a level around 5 gm$^{-2}$.

Adhesive layer (10) is preferably formed of an extrudable, thermoplastic material, for instance a copolymer of ethylene, for instance with vinyl acetate, (meth)acrylic acid or acrylate esters.

The seal of FIG. 1 is preferably cut to include a small tab extending beyond the circumference of a mouth of a container to be closed by the seal. The tab may be folded over during application of the seal to the mouth of a filled container or may extend beyond the circumference of the container mouth during the sealing operation. Sealing is by induction heating of the is metal foil (4) which melts hot melt layer (8) to adhere the seal to the mouth of a container.

Figure 2:
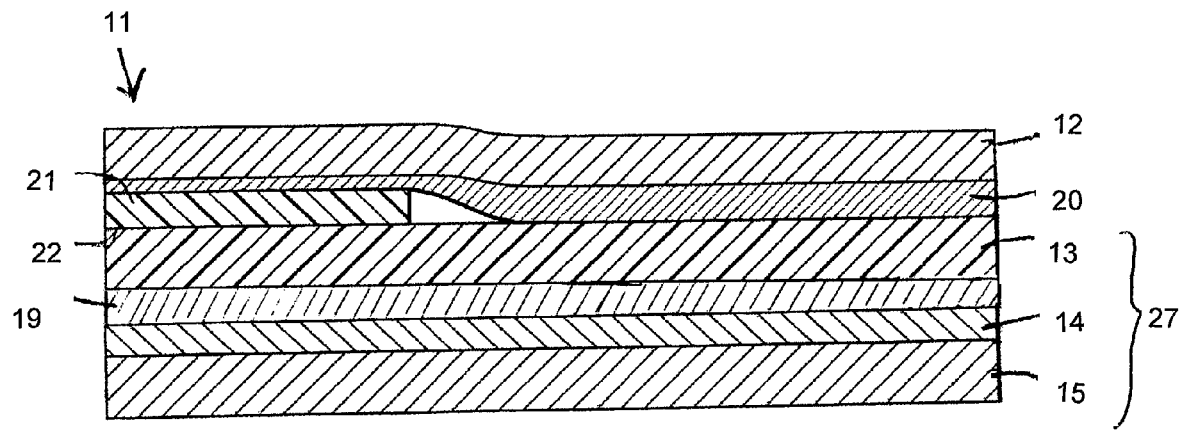
FIG. 2 represents a section through a tabbed seal according to another embodiment of the invention.

A second embodiment of the invention shown in FIG. 2 is a tabbed seal (11). This is formed of a plastics layer (12), a foam layer (13), a foil layer (14) and a heat seal layer (15). Adhesive layer (19) adheres the foam (13) to the foil (14), whilst adhesive layer (20) adheres the plastics film layer (12) to the foam layer (13). In this embodiment there is also provided a tabstock layer (21). This is interposed between the adhesive layer (20) and the foam layer (13), whereby it is adhered to the plastics film layer (12), leaving the interface (22) between the plastics film (21) and foam (13) free of adhesion. This allows the tab to be lifted for removal of the seal from a container by the consumer.

The embodiment of FIG. 2 is preferably made by feeding a plastics film to form layer (12) and tabstock (21) to a laminating station, with a preformed laminate of foam (13) and foil (14), along with corresponding adhesive (19) and heat seal portion (15), with adhesive (20) being applied at the lamination station. The adhesive may be applied as a curtain of extruded material, for instance as illustrated in FIGS. 3 and 4.

Alternatively, in place of the curtain of extruded material, a liquid may be applied using a roller, knife or other liquid coating apparatus to the interface.

Alternatively a heat seal layer (20) preformed on the underside of the plastics film (12) may be melted by a hot roller (31) while pressure is applied between rollers (30 and 31). In this embodiment (not illustrated) the form may be somewhat thinner, for instance at least 125 μm, but no more than 180 μm, as the foam is not exposed to such high temperatures and hence does not increase in density in the process so much as in the extrusion lamination process.

Figure 3:
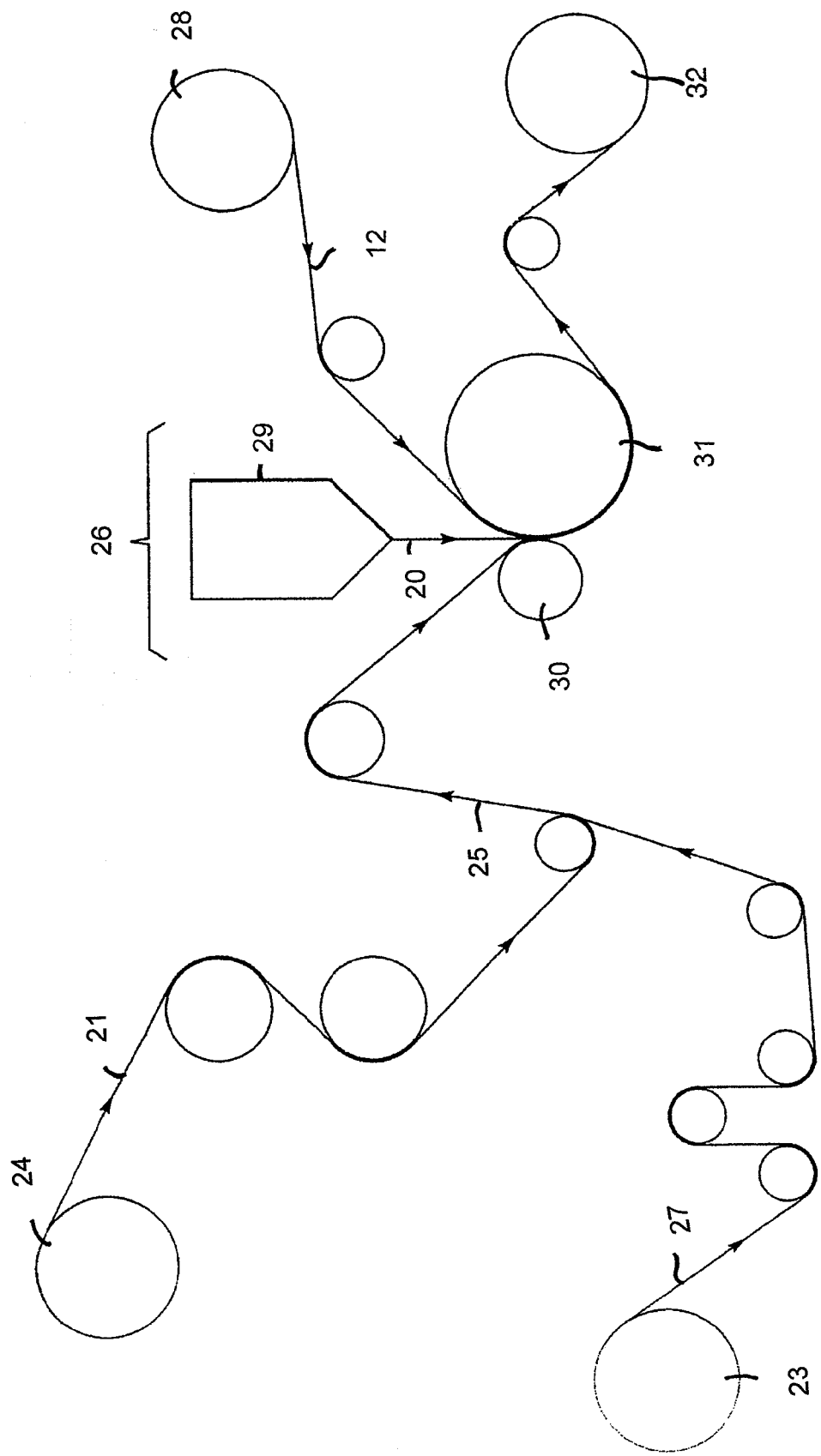
FIG. 3 represents a schematic diagram of part of a manufacturing live for the embodiment of FIG. 2.
Figure 4:
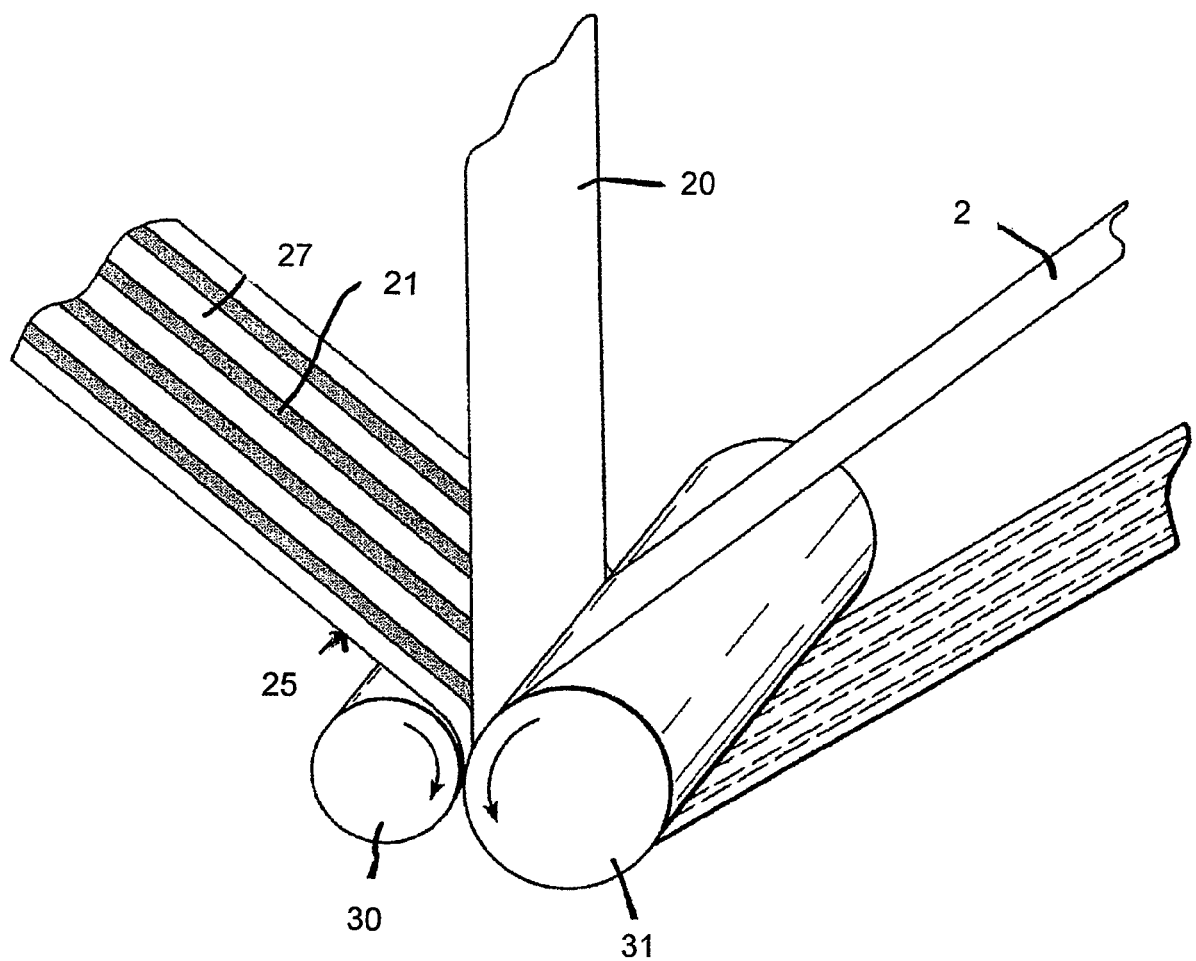
FIG. 4 is a perspective view of part of the line of figures.

In FIG. 3 is shown schematic diagram of a method for manufacturing the tabbed seal according to FIG. 2.

A preformed laminate (27), comprising as its top surface foam layer (13), also comprising foil (14) and corresponding adhesion layer (19), and heat seal layer (15), is fed from a reel (23) towards laminating station (26). From reel (24) is fed tabstock, generally comprising several strips of tabstock materially arranged across the machine direction of the apparatus, from reel (24). At (25) the tabstock and preformed laminate (27) are fed together towards the laminating station (26). Also fed to the laminating station (26) is plastics film layer (12) from the reel (28). The plastics film (12) is fed to the laminating station so that it lies over the foam/tabstock surface and is adhered thereto by adhesive (20), in this case fed as a curtain from extruder (29). Pressure is applied between a pressure roller (30) and roller (31), to which heat or cooling may be applied as desired. The formed laminate is then reeled up on reel (32). Optionally the web is slit before reeling, for instance to form reels comprising a single strip of tabstock, from which seals may be punched. Alternatively, a web comprising several strips of tabstock may be reeled as a single web and slit immediately before use.

The invention claimed is:

1. A seal for a container for comestibles formed of a laminate comprising:
   a) a plastic top layer;
   b) a plastic/foam adhesive layer;
   c) a foam layer;
   d) a foam/foil adhesive layer;
   e) a metal foil;
   f) a heat seal layer;
   wherein the plastic/foam adhesive layer adheres the foam layer to the plastic top layer over at least a portion of their facing surfaces, wherein the foam/foil adhesive layer adheres the foam layer to the metal foil over substantially the entire area of their facing surfaces with a bond strength of at least 8N/12.5 mm; and
   an overall density of the total seal in the range of 0.6 to 0.95 g/ml.

2. A seal according to claim 1, in which the foam layer comprises a polyolefin foam.

3. A seal according to claim 2, in which the polyolefin foam layer has a thickness in the range 175 to 350 μm.

4. A seal according to claim 1, in which the metal foil is aluminium.

5. A seal according to claim 4, in which the aluminium foil is at least 12 μm thick.

6. A seal according to claim 1, in which the plastic top layer is polyester.

7. A seal according to claim 1, in which the plastic top layer comprises a tab which lies wholly within the circumference of the seal and comprises a segment of the seal area over which the plastic top layer is not adhered to the foam layer.

8. A seal according to claim 7, in which the tab comprises a segment-shaped layer of plastics material adhered on the side of a seal-shaped layer of plastics material and adhered to the layer of plastics material by a layer of the plastic/foam adhesive.

9. A seal according to claim 8, in which the tab is polyester.

10. A seal according to claim 7, in which the plastic/foam adhesive layer comprises a two-part polyurethane composition.

11. A seal according to claim 7, in which the plastic/foam adhesive layer comprises an extruded thermoplastic adhesive.

12. A seal according to claim 1, in which the foam/foil adhesive layer is a hot melt adhesive applied from a co-extended coating on the plastic top layer.

13. A container cap containing a seal according to claim 1.

14. A cap according to claim 13, which has a screw closure.

15. A cap according to claim 13 which is a snap-on cap.

16. A sealed container comprising a vessel and, inside the vessel a comestible material, wherein the vessel has a mouth, and the mouth is sealed with a seal according to claim 1 which is adhered to the mouth of the vessel via said heat seal layer.

17. A container according to claim 16, in which the comestible material is a potable liquid.

18. A container according to claim 16, wherein the vessel is formed of polyester.

19. A container according to claim 16, wherein the vessel has a neck to which is attached a screw top overlying the seal.

20. A method of providing a closed container in which,
   a) a vessel having a mouth is at least partly filled with a comestible material;
   b) a seal according to claim 1 is positioned across the mouth of the vessel; and
   c) the seal is heat-sealed by application of heat to the heat seal layer and pressure between the seal and the mouth of the vessel.

21. A method according to claim 20, in which heat is applied by induction heating of the metal foil.

22. A method according to claim 20, wherein the vessel has a neck and the seal is positioned across the mouth by application of a cap carrying the seal onto the neck in such a manner as to apply said pressure, followed by application of heat to melt the heat seal layer.

23. A method according to claim 22, in which the vessel is formed of polyester.

24. A method according to claim 20, in which the comestible material is a potable liquid.

25. A laminate web comprising:
   a) a polyester top layer;
   b) a plastic/foam adhesive layer;
   c) a polyolefin foam layer having a thickness of at least 125 μm;
   d) a foam/foil adhesive layer;
   e) an aluminium foil layer having a thickness of at least 12 μm; and
   f) a heat seal layer;
   wherein the foam/foil adhesive layer adheres the polyolefin foam layer to the aluminium foil layer over substantially the entire area of their facing surfaces with a bond strength of at least 8N/12.5 mm; and
   an overall density of the total seal of no more than 0.95 g/ml.

26. A laminate web according to claim 25, in which the polyester top layer includes:
   i) a tabstock material strip which extends part way across the width of the web; and
   ii) a continuous plastic film;
   and the tabstock material strip is between the continuous plastic film and the polyolefin foam layer and is adhered to the continuous plastic film but not to the polyolefin foam layer by the said plastic/foam adhesive layer.

27. A laminate web according to claim 26, which includes several strips of tabstock material across the width of the web, each extending substantially the full length of the web.

28. A manufacturing method for forming a laminate web wherein:
   a) a preformed laminate of heat seal layer, a metal foil, a foam/foil adhesive layer and a foam layer and a plastic film are separately fed to a lamination station so that the plastic film is on the foam side of the preformed laminate;

b) a plastic/foam adhesive is applied between the mutually facing surfaces of the plastic film and the foam layer; and c) pressure is applied in the laminating station and the plastic/foam adhesive is cured whereby the surfaces are adhered to one another;

wherein in the preformed laminate the foam layer and the metal foil/heat seal layer are joined by a bond strength of at least 8N/12.5 mm;

and wherein in the preformed laminate the foam layer has a thickness of at least 125 μm and a density of no more than 0.7 g/ml such that the overall density of the laminate web is about 0.6 to about 0.95 g/ml.

29. A manufacturing method according to claim 28 in which the adhesive is applied by extrusion of an extrudable adhesive.

30. A manufacturing method according to claim 28, wherein a tabstock material having a width less than the width of the plastic film is fed to the laminating station and is interposed between the plastic/foam adhesive and the plastic film, whereby the adhesive adheres the tabstock to the plastic film in addition to adhering the plastic film to the foam layer in the region extending beyond the tabstock material.

* * * * *